(12) United States Patent
Clark et al.

(10) Patent No.: US 7,427,939 B2
(45) Date of Patent: Sep. 23, 2008

(54) PARALLEL PROCESSED ELECTRONIC DISPERSION CONTROL

(75) Inventors: Matthew Clark, Wake Forest, NC (US); Wes Smith, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/617,389

(22) Filed: Dec. 28, 2006

(65) Prior Publication Data

US 2008/0158034 A1 Jul. 3, 2008

(51) Int. Cl.
 *H03M 1/12* (2006.01)
(52) U.S. Cl. .................................. 341/155; 341/120
(58) Field of Classification Search .............. 341/120, 341/155; 455/132; 708/313; 375/342
 See application file for complete search history.

(56) References Cited

U.S. PATENT DOCUMENTS

| | | | | |
|---|---|---|---|---|
| 5,058,170 A | * | 10/1991 | Kanamori et al. ............. 381/92 |
| 5,177,699 A | * | 1/1993 | Nishio .......................... 708/313 |
| 6,094,464 A | * | 7/2000 | Ebringer et al. ............. 375/342 |
| 6,473,013 B1 | * | 10/2002 | Velazquez et al. ........... 341/120 |
| 6,639,537 B1 | * | 10/2003 | Raz .............................. 341/155 |
| 6,753,772 B2 | * | 6/2004 | Winkler ....................... 340/511 |
| 6,836,235 B2 | * | 12/2004 | Asami .......................... 341/155 |
| 7,266,310 B1 | * | 9/2007 | Savory et al. ................ 398/205 |
| 2002/0169603 A1 | * | 11/2002 | Sculley ......................... 704/229 |
| 2003/0034909 A1 | * | 2/2003 | Wong .......................... 341/155 |
| 2003/0058148 A1 | * | 3/2003 | Sheen ........................... 341/155 |
| 2005/0026578 A1 | * | 2/2005 | Kelley .......................... 455/132 |

\* cited by examiner

*Primary Examiner*—Jean B Jeanglaude
(74) *Attorney, Agent, or Firm*—Grossman, Tucker, Perreault & Pfleger, PLLC

(57) ABSTRACT

An apparatus, system and method for providing electronic dispersion compensation. In one embodiment an apparatus may include an analog-to-digital converter and a plurality of adaptive filters arranged in parallel. The analog-to-digital converter may output blocks of samples, associated portions of which may be provided as inputs to the filters. Data combining circuitry may receive each of the associated outputs and provide a digital signal output. Of course, many alternatives, variations, and modifications are possible without departing from this embodiment.

16 Claims, 4 Drawing Sheets

PARALLEL PROCESSED ELECTRONIC DISPERSION CONTROL

FIELD

The present disclosure relates to electronic dispersion control, and, more particularly, relates to electronic dispersion control using parallel processing.

BACKGROUND

An optical signal propagating within an optical fiber may be affected by various dispersion phenomena. Common types of dispersion phenomena include chromatic dispersion, polarization mode dispersion, and modal dispersion. Chromatic dispersion relates to the wavelength-dependency of the rate of travel of an optical signal in an optical fiber, i.e. different wavelengths propagate at different speeds in an optical fiber. Polarization mode dispersion relates to the polarization-dependency of the rate of travel of an optical signal in an optical fiber, i.e. different polarizations travel at different speeds. Especially in long haul transmission systems, e.g. of 40 km or more, chromatic and polarization dispersion can lead to optical pulse broadening and/or intersymbol interference (ISI) that may affect the ability to recover the signal at a receiver.

Modal dispersion may be particularly significant in multimode fibers (MMF) that are widely used for shorter reach applications, e.g. up to several hundred meters. Modal dispersion relates to the modal-dependency of the rate of travel of an optical signal in an optical fiber. In particular, an optical pulse in a MMF may split into several paths (modes) that travel at different speeds. Modal dispersion may lead to optical pulse broadening and/or ISI.

Chromatic dispersion, polarization mode dispersion and modal dispersion may be compensated or controlled in the optical domain using various techniques. Compensation of these and other dispersion phenomena in the electrical domain may be referred to as electronic dispersion compensation (EDC).

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
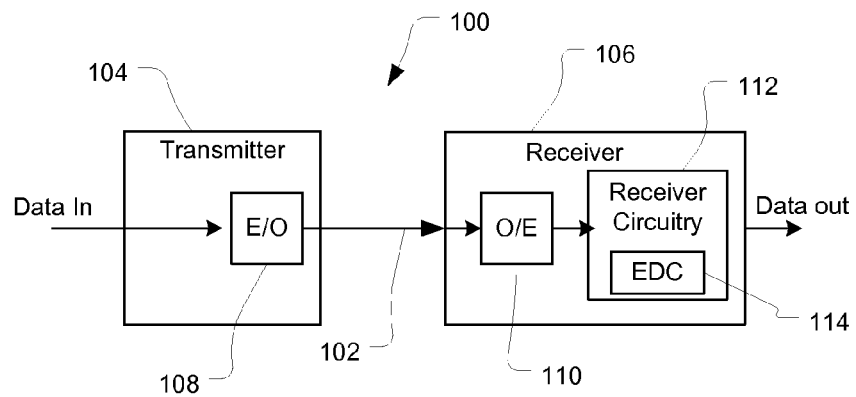
FIG. 1 is a block diagram of a communication system consistent with one embodiment of the present disclosure.

Turning now to FIG. 1, there is illustrated an exemplary optical communication system 100. The transmission system 100 serves to transmit one or more optical signals over an optical information path 102 from a transmitting terminal 104 to one or more receiving terminals 106. Those of ordinary skilled in the art will recognize that the system 100 has been depicted as a highly simplified point-to-point system form for ease of explanation. For example, the transmitting terminal 104 and receiving terminal 106 may, of course, both be configured as transceivers, whereby each may be configured to perform both transmitting and receiving functions to facilitate bi-directional communication therebetween. For ease of explanation, however, the terminals may be depicted and described herein with respect to only a transmitting or receiving function. It is to be understood that systems and methods consistent with the present disclosure may be incorporated into a wide variety of optical communication system configurations and components. The illustrated exemplary embodiments herein are provided only by way of explanation, not of limitation.

Known electrical-to-optical (E/O) converter circuitry 108 at the transmitter may be configured to modulate electrical data DATA IN onto one or more optical wavelengths/channels. In single channel system, for, example, the E/O circuitry 108 may modulate input data onto a single wavelength for transmission over the optical information path 102 to the receiver 106. In a wavelength division multiplexed (WDM) system, the E/O circuitry 108 may generate a plurality of separate optical signals by modulating data on each of a plurality of different wavelengths/channels within a signal bandwidth using, for example, laser sources, data modulators, optical dispersion compensation devices, and one or more multiplexers. The separate channels may be transmitted by the transmitter 104 as an aggregate optical signal over the optical information path 102 to the receiver 106.

The optical information path 102 may have any length. In one embodiment, the system 100 may be a short-reach system, e.g. as a portion of a local area network, wherein the path 102 extends up to several hundred meters between the transmitter 104 and receiver 106. In a short-reach system the path 102 may include MMF. In another embodiment, the system 100 may be a long-haul optical communication system wherein the path 102 extends 40 km or more between the transmitter 104 and the receiver 106. In a long-haul system the path may include: optical transmission cable including single mode fiber pairs, one or more repeaters, optical dispersion compensation devices, and other active and passive components depending on system characteristics.

At the receiver 106, the optical signal(s) may be converted into electrical signal(s) using known optical-to-electrical (O/E) converter circuitry 110. In a single channel system, for example, the O/E circuitry 110 may include a known photodetector. In a WDM system the O/E circuitry may include a demultiplexer and photodetectors associated with each of the plurality of channels transmitted in the aggregate signal.

The electrical signals from the O/E circuitry 110 may be coupled to receiver circuitry 112 including electronic dispersion compensation (EDC) circuitry 114. The EDC circuitry 114 may implement one or more parallel processed electronic dispersion compensation techniques to reduce or eliminate the effects of dispersion in the output of the O/E circuitry. In addition to the EDC circuitry 114 the receiver circuitry 112 may include known circuitry for recovering, e.g. demodulating, the data and clock signals and providing one or more electrical output signals. The receiver 106 may provide an electrical data output signal DATA OUT corresponding to the data input signal DATA IN.

Figure 2:
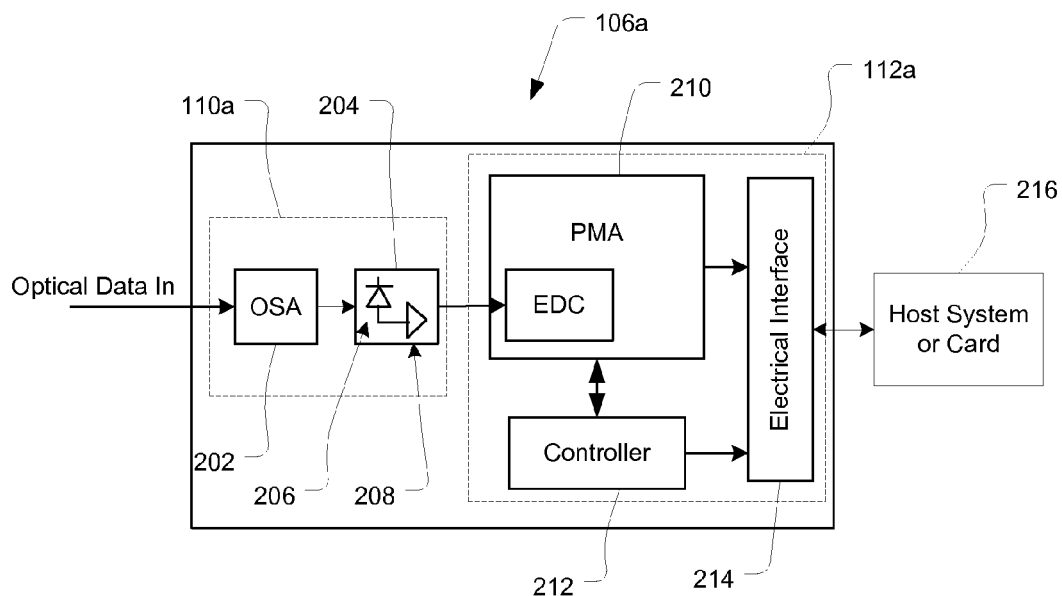
FIG. 2 is a block diagram of a receiver consistent with one embodiment of the present disclosure.

FIG. 2 illustrates, in simplified block diagram form, one exemplary embodiment 106a of an optical signal receiver 106 consistent with the present disclosure. For simplicity and ease of explanation, the illustrated exemplary embodiment is shown and described as receiving a single optical channel as an input. Again, however, it is to be understood that a system consistent with the present disclosure may be configured to transmit and receive any number of optical signals.

The illustrated embodiment includes O/E circuitry 110a for receiving the optical input data OPTICAL DATA IN, e.g. from path 102, and receiver circuitry 112a coupled to the O/E circuitry 110a for receiving an electrical output thereof. The O/E circuitry 110a includes a known optical signal amplifier (OSA) 202, e.g. an erbium doped fiber amplifier, for amplifying the input signal and a photodetector and amplifier pair 204 for receiving the output of the amplifier 202. The photodetector portion 206 of the pair 204 may include, for example, an InP or GaAs positive intrinsic-negative doped (PIN) photodiode or an avalanche photodiode (APD). The amplifier 208 may include a known electrical signal amplifier, e.g. a transimpedance amplifier, for converting photocurrent output of the photodetector 206 into a voltage output.

The electrical output of the O/E circuitry is coupled to the receiver circuitry 112a. The receiver circuitry 112a may include physical medium attachment (PMA) circuitry 210 including EDC 114 circuitry consistent with the present disclosure, a controller 212 and an electrical interface 214. The PMA circuitry 210 may also include known circuitry, e.g. clock and data recovery/demultiplexer circuitry (CDR/DeMUX) for reliably detecting the data in the electrical output of the O/E circuitry at high data rates, e.g. rates of up to 10 Gb/s or more. The EDC circuitry 114 may implement one or more parallel processed electronic dispersion compensation techniques to reduce or eliminate the effects of dispersion in the output of the O/E circuitry 110a.

The controller 212 may take a known configuration implemented in analog hardware, as a microcontroller, or combinations thereof. The controller may set control parameters for the PMA circuitry 210, which may vary over time and temperature, or when system configuration is changed. The electrical interface 214, may be any known interface for providing data transfer to a host system or card 216, clocking channels, control and monitoring channels, and DC power and ground connections. The interface 214 may be configured, for example, as a socket that plugs into the plane of a host board or as a board-edge connection that mates to a socket in the plane of a host board.

Figure 3:
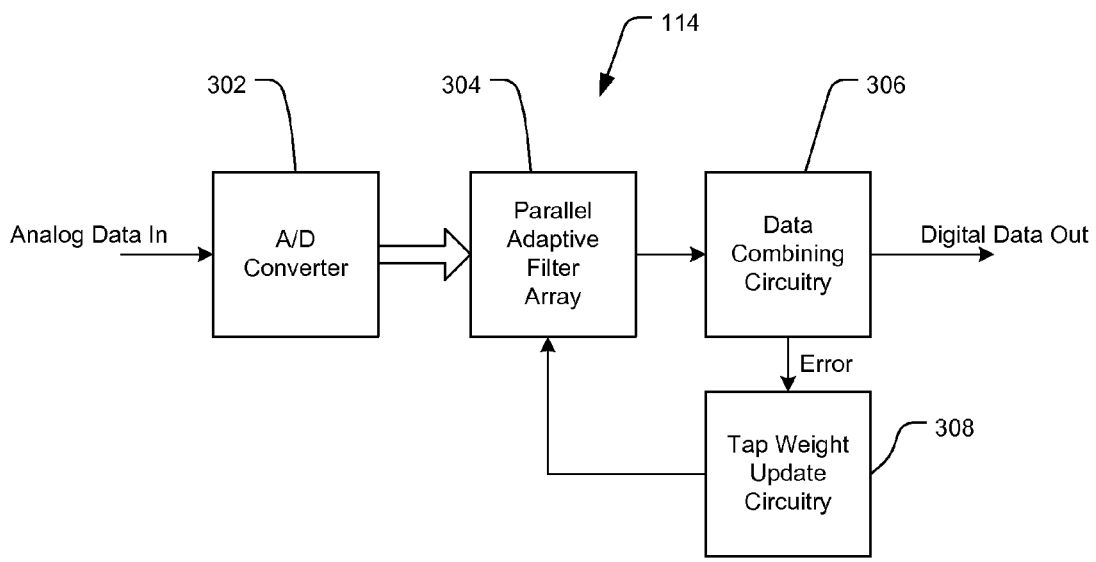
FIG. 3 is a block diagram of one embodiment of EDC circuitry consistent with the present disclosure.

FIG. 3 illustrates one exemplary embodiment of EDC circuitry 114. The illustrated exemplary embodiment includes analog-to-digital (A/D) converter circuitry 302, a parallel adaptive filter array 304, data combining circuitry 306, and tap weight update circuitry 308. In general the A/D converter circuitry 302 may receive the electrical signal output of the O/E circuitry 110,110a as an analog data input signal ANALOG DATA IN. In a known manner, the A/D converter circuitry 304 may sample the data input at a sample rate to determine a discrete voltage level appearing at each sample time. Those of ordinary skill in the art will recognize that the sample rate of the A/D converter circuitry may depend on the data transmission rate. In one embodiment, the sample rate may be greater than or equal to about 10 G Hz. The A/D converter circuitry 304 may provide digitized output including a discrete blocks of samples.

The sample blocks or portions thereof may be provided as the inputs to adaptive filters within the parallel adaptive filter array 304, each of which may be implemented in a known configuration. One known adaptive filter configuration useful in a system and method consistent with the present disclosure is a finite impulse response (FIR) filter. In general, a FIR filter restores a transmitted signal by reorganizing the received samples using a finite number of time-dispersed weighted taps that, when adjusted to approximately perform the inverse function of the dispersive channel, will recover the transmitted signal. A FIR filter may include a combination of feed forward time-delayed taps providing linear filtering. The taps may be multiplied by different weights and the weighted taps may be summed to recover the transmitted signal.

Another known adaptive filter configuration is a decision feedback equalizer (DFE) which may include an FIR configuration followed by a number of time-delayed feedback taps. The output of the FIR may be provided to a symbol detector through the time-delayed feedback taps. The feedback taps may be multiplied by different weights and the weighted taps may be summed and added to the output of the FIR configuration. Other known adaptive filter configurations and/or combinations thereof may be implemented in a parallel adaptive filter array 304 consistent with the present disclosure.

The outputs of the adaptive filters within the parallel adaptive filter array 304 may be coupled to the data combining circuitry 306. The data combining circuitry 306 may perform a known data slicing technique to obtain a digital signal. In one example, data slicing may involve comparing the respective filter outputs to a slicing point half way between its minimum and maximum amplitude to provide a digital output. Other known slicing techniques may be implemented. In an embodiment wherein data slicing is implemented in the adaptive filters, it may be omitted from the data combining circuitry. The data combining circuitry 306 may sum the data outputs of the filters within the parallel adaptive filter array 304 to provide a digital output DIGITAL DATA OUT representative of the transmitted data signal.

The data combining circuitry 306 may also provide error correction by applying a known adaptive algorithm to the output DIGITAL DATA OUT. The adaptive algorithm may be implemented to automatically adjust the tap weights provided to the filters to minimize a calculated error relative to an ideal signal. In one exemplary embodiment, the adaptive algorithm may incorporate a least mean square (LMS) approach, which continually compares the filtered output to that of an ideal signal (or the output of an analog eye opening monitor) and provides an error signal ERROR. The error signal may be provided to the tap weight update circuitry 302 which may adjust the tap weights in the parallel adaptive filters to minimize the square of the error. Other known adaptive algorithms, such as a maximum likelihood sequence detection (MLSD) algorithm, may be implemented in EDC circuitry consistent with the present disclosure.

Configuring the A/D converter 302 to output blocks of samples to the parallel adaptive filters consistent with the present disclosure allows use of a clock rate for the A/D converter circuitry output that is significantly slower than the sample rate. In one embodiment, the clock rate for the A/D circuitry 302 may be equal to the number of samples in each output block of the A/D circuitry divided by the sample rate. For example, separate blocks of sixteen samples may be output from the A/D converter circuitry to the parallel adaptive filters to allow use of a clock rate that is $1/16^{th}$ of the sample rate. In an exemplary 10 GHz Ethernet over fiber system configuration including A/D converter circuitry having a sample rate of 10 GHz, this would allow an A/D converter circuitry clock rate of 622 MHz, instead of 10 GHz.

The reduced A/D converter circuitry clock rate allows efficient implementation of the EDC circuitry 114 in a complementary metal-oxide-semiconductor (CMOS) integrated circuit, as opposed, for example, to a silicon-germanium (SiGE) integrated circuit known to be useful for high speed systems. EDC circuitry 114 provided in a CMOS implementation may be designed in a known register transfer language (RTL) and integrated using common synthesis tools, whereas SiGE integrated circuits may require a custom design effort. CMOS implementation of the EDC circuitry 114 allows for efficient changes to design requirements, e.g. bit width, adaptive algorithm, etc. It is to be understood, however, that EDC circuitry 114 consistent with the present disclosure may be implemented in any discrete or integrated implementation, or combinations thereof. For example, the EDC circuitry may be implemented in SiGE along with the other receiver circuitry, or as a separate CMOS component.

Figure 4:
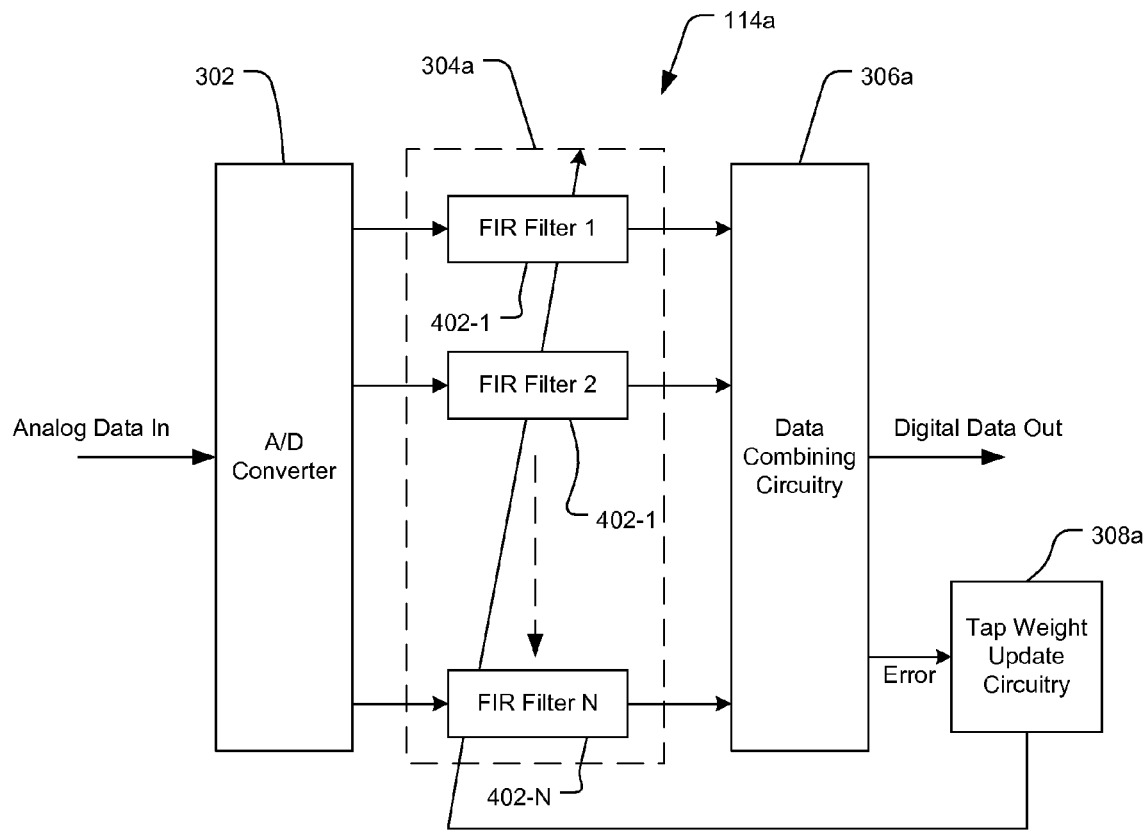
FIG. 4 is a block diagram of another embodiment of EDC circuitry consistent with the present disclosure.

FIG. 4 illustrates one exemplary embodiment 114a of EDC circuitry consistent with the disclosure wherein the parallel adaptive filter array 304a includes a plurality of FIR filters 402-1, 402-2 . . . 402-N. The A/D circuitry 302 may output separate a block of samples. Separate sub-blocks of each block of samples may be provided as an input to respective ones of the FIR filters 402-1, 402-2 . . . 402-N. The outputs of the FIR filters 402-1, 402-2 . . . 402-N may be provided to data combining circuitry 306a. The data combining circuitry 306a may sum the filter outputs to recombine the data represented by the respective sub-blocks and provide a digital output DIGITAL DATA OUT representative of the transmitted data signal. The data combining circuitry 306a may also provide error correction by applying an adaptive algorithm, such as an LMS algorithm, to establish an error signal ERROR. The tap weight update circuitry 308a may update the tap weights for each of the filters 402-1, 402-2 . . . 402-N in response to the error signal, e.g. to minimize the square of the error.

Figure 5:
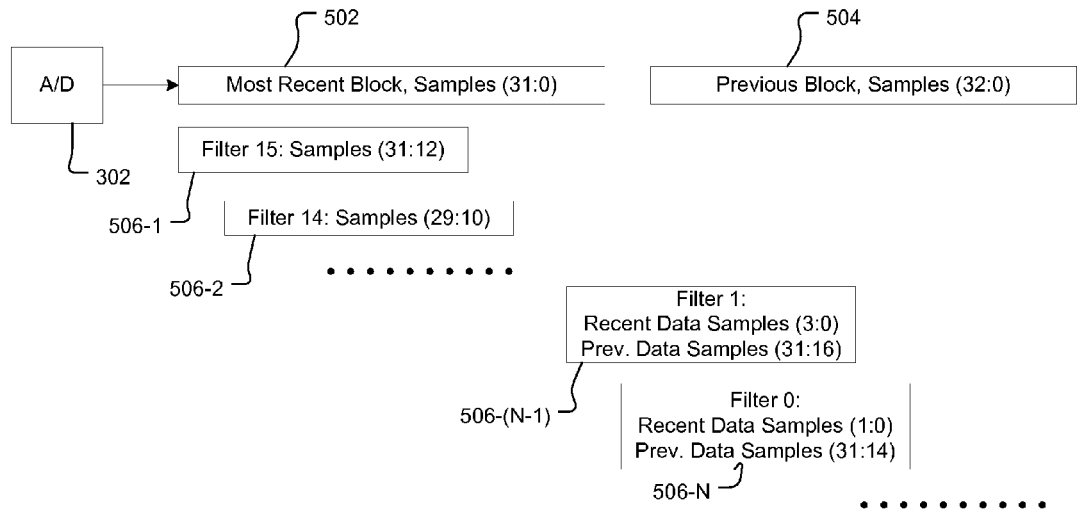
FIG. 5 diagrammatically illustrates one exemplary embodiment of the manner in which the data blocks output from analog-to-digital (A/D) circuitry may be routed to respective filters within a parallel adaptive filter array consistent with the present disclosure.

FIG. 5 diagrammatically illustrates one exemplary embodiment of the manner in which the data blocks output from the A/D circuitry 302 may be routed to respective filters within a parallel adaptive filter array consistent with the present disclosure. In the illustrated exemplary embodiment, the A/D circuitry 302 may be configured to provide separate output blocks of 32 samples, each at a clock rate of, for example 622 MHz, and the parallel adaptive filter array may include 16 filters, i.e. Filter 0 . . . . Filter 15. A most recent block 502 of 32 samples is illustrated along with a previous block 504 of 32 samples.

As shown, sub-blocks 506-1, 506-2 . . . 506-(N−1), 506-N of 20 samples each may be provided to each filter. In particular, sub-block 506-1 including samples 31 to 12 may be provided to filter 15, and sub-block 506-2 including samples 29 to 10 may be provided to filter 14, etc. Filter 1 may receive sub-block 506-(N−1) including samples 3 to 0 from the most recent block 502 and samples 31 to 16 of the previous block 504. Filter 0 may receive sub-block 506-N including samples 31 to 14 of the previous block 504 and 1 to 0 of the current block 502. The outputs of the filters may be provided to data combining circuitry 306 which may sum the filter outputs to recombine the data represented by the respective sub-blocks and provide a digital output representative of the transmitted data signal. Although the illustrated exemplary embodiment shows blocks of 32 samples and sub-blocks of 20 samples it is to be understood that any block and sub-block size may be implemented in EDC circuitry consistent with the present disclosure.

Figure 6:
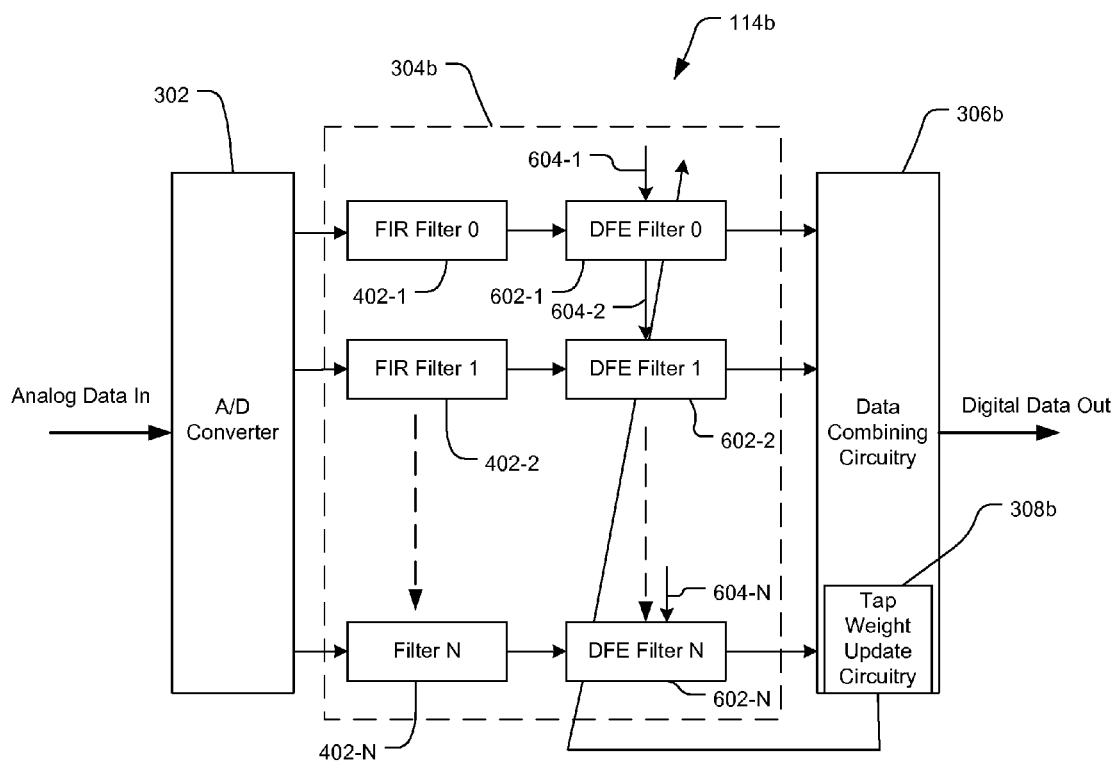
FIG. 6 is a block diagram of another embodiment of EDC circuitry consistent with the present disclosure.

Turning now to FIG. 6, there is illustrated another exemplary embodiment 114b of EDC circuitry consistent with the disclosure wherein the parallel adaptive filter array 304b includes a plurality of FIR filters 402-1, 402-2 . . . 402-N followed by associated DFE filters 602-1, 602-2 . . . 602-N. The A/D circuitry 302 may output separate a block of samples. Separate sub-blocks of each block of samples may be provided as an input to respective ones of the FIR filters 402-1, 402-2 . . . 402-N. The outputs of the FIR filters 402-1, 402-2 . . . 402-N may be provided to associated ones of the DFE filters 602-1, 602-2 . . . 602-N. The outputs of the DFE filters 602-1, 602-2 . . . 602-N may be provided to the data combining circuitry 306b, and may also be fed back to subsequent ones of the DFE filters 602-1, 602-2 . . . 602-N, e.g. on paths 604-1, 604-2 . . . 604-N.

The data combining circuitry 306b may sum the DFE filter outputs to recombine the data represented by the respective sub-blocks and provide a digital output DIGITAL DATA OUT representative of the transmitted data signal. The data combining circuitry 306b may also provide error correction by applying an adaptive algorithm, such as an LMS algorithm, to establish an error signal. The tap weight update circuitry 308b may update the feed back tap weights for each of the DFE filters 602-1, 602-2 . . . 602-N in response to the error signal, e.g. to minimize the square of the error.

Figure 7:
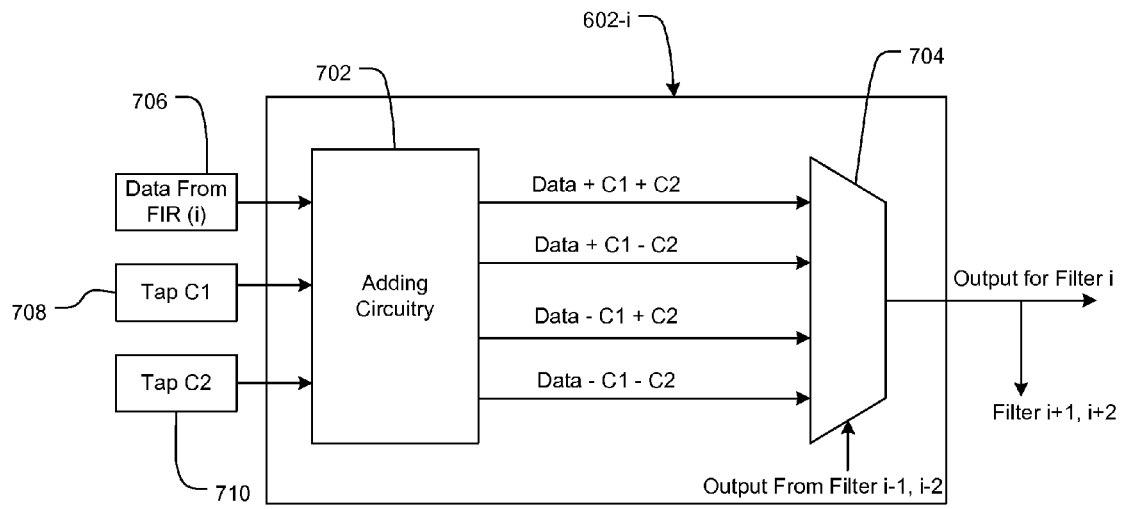
FIG. 7 is a block diagram of a decision feedback equalizer (DFE) useful in one embodiment of EDC circuitry consistent with the present disclosure.

FIG. 7 illustrates one exemplary embodiment of a DFE filter 602-i useful in a configuration as shown, for example, in FIG. 6. The illustrated exemplary filter includes adding circuitry 702 and decision circuitry 704. The adding circuitry 702 may add data 706 from the associated FIR filter 402-I to the tap weights 708(C1) and 710(C2) provided by the tap weight update circuitry 308 to provide outputs including the Data+C1+C2, Data+C1−C2, Data−C1+C2, and Data−C1−C2. These outputs may be provided to the decision circuitry 704, along with data outputs from previous DFE filters, 602 (i−1) and 602(i−2). The decision circuitry 704 may calculate an output for the filter OUTPUT FOR FILTER I in a known manner. For example, the decision circuitry may perform operations to calculate all possible solutions for the filter output according to:

Output for Filter(i)=Q[C1*D(n−1)+C2*D(n−2)+Data from FIR(i)]  (Equation 1)

where Q is a the non linear quantization or slice operator, C1 and C2 are tap weights, D(n−1) and D(n−2) are data outputs from the previous two DFE filters, 602 (i−1) and 602(i−2) provided as feedback signals to the filter 602 (i), and Data from FIR (i) is the data 706 from the associated FIR filter. The output for the Filter (i) may then be chosen from the calculated outputs based on the results determined for the previous filters 602 (i−1) and 602(i−2). Other known methods for calculating the output for filter (i) may be implemented by the decision circuitry.

Figure 8:
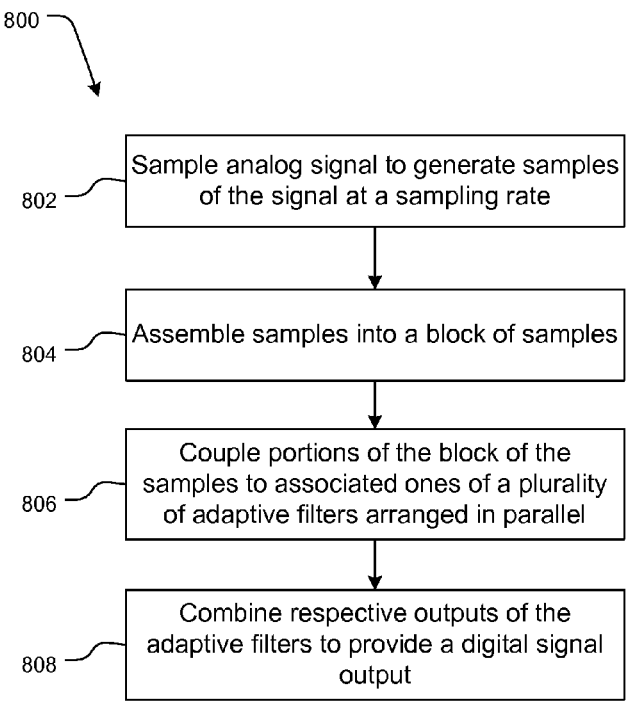
FIG. 8 is a block flow diagram illustrating one exemplary method consistent with the present disclosure.

FIG. 8 is a block flow diagram of one exemplary method 800 of providing electronic dispersion compensation consistent with the present disclosure. The block flow diagram is illustrated with a particular sequence of steps. It can be appreciated, however, that the sequence of steps merely provides an example of how the general functionality of the exemplary embodiment may be implemented. Further, each sequence of steps does not have to be executed in the order presented unless otherwise indicated.

As shown, in one embodiment an analog signal may be sampled 802 to generate samples of the signal at a sampling rate, the samples may be assembled 804 into a block of samples, and respective portions of the block of the samples may be coupled 806 to associated ones of a plurality of adaptive filters arranged in parallel. The respective outputs of the adaptive filters may be combined 808 to provide a digital signal output that reduces or eliminates the effects of dispersion appearing in the analog signal.

Accordingly, an apparatus, consistent with one embodiment, may include: an analog-to-digital converter configured to sample an analog signal at a sample rate and provide an output including a block of samples; a plurality of a adaptive filters arranged in parallel, each of the adaptive filters being configured to receive an associated portion of the block of samples and provide an associated output; and data combining circuitry configured to receive each of the associated outputs and provide a digital signal output.

Consistent with a further embodiment, a system may include: a transmitter configured to transmit an optical signal; a receiver configured to receive the optical signal; and a transmission path extending between the transmitter and the receiver. The receiver may include optical-to-electrical converter circuitry for converting the optical signal to an analog signal, analog-to-digital converter circuitry configured to sample the analog signal at a sample rate and provide an output including a block of samples, a plurality of a adaptive filters arranged in parallel, each of the adaptive filters being configured to receive an associated portion of the block of samples and provide an associated output, and data combining circuitry configured to receive each of the associated outputs and provide a digital signal output.

Consistent with a further embodiment, a method may include: sampling an analog signal to generate samples of the signal at a sampling rate; providing a block of the samples; coupling respective portions of the block of the samples to associated ones of a plurality of adaptive filters arranged in parallel; and combining respective outputs of the adaptive filters to provide a digital signal output.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
   an analog-to-digital converter configured to sample an analog signal at a sample rate and provide an output comprising a block of samples;
   a plurality of finite impulse response filters arranged in parallel, each of said finite impulse response filters being configured to receive an associated portion of said block of samples and provide an associated output;
   a plurality of decision feedback equalizers arranged in parallel, each of said decision feedback equalizers being configured to receive said associated output and to generate a DFE output; and
   data combining circuitry configured to receive each of said DFE outputs and provide a digital signal output.

2. An apparatus according to claim 1, wherein said sample rate is greater than or equal to 10 GHz.

3. An apparatus according to claim 1, wherein an output of each of said DFEs is provided as a feedback signal to at least one other one of said DFEs.

4. An apparatus according to claim 1, wherein each of said decision feedback equalizers is configured to provide one of said DFE outputs at least partially in response to one or more tap weights, said tap weights being provided in response to an error signal calculated using an adaptive algorithm.

5. An apparatus according to claim 4, wherein said adaptive algorithm is a least mean squared algorithm.

6. An apparatus according to claim 4, said apparatus further comprising tap weight update circuitry for adjusting said tap weights in response to said error signal.

7. A system comprising:
   a transmitter configured to transmit an optical signal;
   a receiver configured to receive said optical signal; and
   a transmission path extending between said transmitter and said receiver, said transmission path,
   said receiver comprising
   optical-to-electrical converter circuitry for converting said optical signal to an analog signal,
   analog-to-digital converter circuitry configured to sample said analog signal at a sample rate and provide an output comprising a block of samples,
   a plurality of finite impulse response (FIR) filters arranged in parallel, each of said FIR filters being configured to receive an associated portion of said block of samples and provide an associated output,
   a plurality of decision feedback equalizers arranged in parallel, each of said decision feedback equalizers being configured to receive said associated output and to generate a DFE output; and
   data combining circuitry configured to receive each of said DFE outputs and provide a digital signal output.

8. A system according to claim 7, wherein said sample rate is greater than or equal to 10 GHz.

9. A system according to claim 7, wherein an output of each of said DFEs is provided as a feedback signal to at least one other one of said DFEs.

10. A system according to claim 7, wherein each of said DFEs is configured to provide one of said DFE outputs at least partially in response to one or more tap weights, said tap weights being provided in response to an error signal calculated using an adaptive algorithm.

11. A system according to claim 10, wherein said adaptive algorithm is a least mean squared algorithm.

12. A system according to claim 10, said apparatus further comprising tap weight update circuitry for adjusting said tap weights in response to said error signal.

13. A method comprising:
   sampling an analog signal to generate samples of said signal at a sampling rate;
   providing a block of said samples;
   coupling respective portions of said block of said samples to associated ones of a plurality of Finite Impulse Response (FIR) filters arranged in parallel, each of said FIR filters being configured to receive an associated portion of said block of samples and provide an associated output;

receiving each associated output at each of a plurality of decision feedback equalizers (DFEs) arranged in parallel;

generating a DFE output at each of said plurality of decision feedback equalizers; and combining the DFE outputs of said DFEs to provide a digital signal output.

14. A method according to claim 13, wherein said sample rate is greater than or equal to 10 GHz.

15. A method according to claim 13, wherein each of said DFEs is configured to provide one of said DFE outputs at least partially in response to one or more tap weights, said tap weights being provided in response to error signal calculated using an adaptive algorithm.

16. A method according to claim 15, wherein said adaptive algorithm is a least mean squared algorithm.

* * * * *